United States Patent
Ando et al.

(10) Patent No.: US 7,749,056 B2
(45) Date of Patent: Jul. 6, 2010

(54) GAME SYSTEM WITH CHANGING CHARACTER CONTROL

(75) Inventors: Hiroshi Ando, Tokyo (JP); Shiro Takehara, Tokyo (JP); Akihito Fujiwara, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 1138 days.

(21) Appl. No.: 10/573,598

(22) PCT Filed: Sep. 27, 2004

(86) PCT No.: PCT/JP2004/014108

§ 371 (c)(1),
(2), (4) Date: Mar. 24, 2006

(87) PCT Pub. No.: WO2005/030355

PCT Pub. Date: Sep. 27, 2004

(65) Prior Publication Data

US 2007/0004482 A1 Jan. 4, 2007

(30) Foreign Application Priority Data

Sep. 25, 2003 (JP) ............................. 2003-334145

(51) Int. Cl.
*A63F 9/14* (2006.01)
(52) U.S. Cl. ............................................. 463/6; 463/42
(58) Field of Classification Search .................... 463/6, 463/32, 42
See application file for complete search history.

(56) References Cited

U.S. PATENT DOCUMENTS 6,306,039 B1 10/2001 Kaji et al.

(Continued)

FOREIGN PATENT DOCUMENTS

JP 2002-239246 8/2002

(Continued)

OTHER PUBLICATIONS

House, Matthew. "Chocobo Racing—Overview." Allgame. Web. Sep. 22, 2009. <http://www.allgame.com/game.php?id=23664&tab=overview>.*

(Continued)

*Primary Examiner*—Joe H Cheng
*Assistant Examiner*—Andrew Kim
(74) *Attorney, Agent, or Firm*—Finnegan, Henderson, Farabow, Garrett & Dunner, L.L.P.

(57) ABSTRACT

To provide a game system in which each of the players in turn controls a common character (operation object) so as to enjoy a continuous electric game; and to provide a game system in which a previous player who has been replaced by another player still has willing to participate in the game.

There is provided a game system to which a plurality of players can access via respective operation terminals. According to input data from the operation terminals, a calculation processing device executes a game program, judges that a plurality of players are participating in the game, establishes teams, each consisting of a plurality of players, assigns a common character to each team, decides a reference point when the operation of the character is to be performed by another player belonging to the same team according to the program, judges whether the character has reached the reference point according to the parameter of the character, and, if the judgment is yes, offers the operation right of the character to another player, and controls the game system to continue the operation of the character addording to the signal from the operation terminal of the another player.

9 Claims, 7 Drawing Sheets

U.S. PATENT DOCUMENTS 6,488,505 B1 * 12/2002 Hightower ................ 434/69
2003/0177347 A1   9/2003 Schneier

FOREIGN PATENT DOCUMENTS

JP    2003-190641    7/2003
WO   WO 0105475    1/2001

OTHER PUBLICATIONS

ASCII Corp., "LOGIN," vol. 3, No. 11, 3 sheets, (Aug. 8, 1984).

* cited by examiner

GAME SYSTEM WITH CHANGING CHARACTER CONTROL

BACKGROUND OF THE INVENTION

The present invention relates to a game system, and in particular relates to a game system which is capable of performing information processing operation related to a competition game of the relay method.

In recent years, due to the development of communication technique, it has become possible for each one of several players at far separated locations to connect game devices to the internet, and mutually to experience the same game at the same time.

Since such a game device includes a micro computer, and is made so as to be able to perform virtual three dimensional image processing, accordingly it is possible to perform various games in which a plurality of players are present within a virtual play space with common coordinates.

A race game is one of these types of game. In such a race game, several users determine on automobile characters which each of them will operate, and, from the speeds and running positions and so on of these various automobile characters, a server determines on parameters for these various automobile characters to compete. The various game devices based on these parameters, the game devices display competition images on their display devices. The scores of the various automobile characters are calculated and compared by the server, and thereby it determines on the competitive rankings of the automobile characters.

SUMMARY OF THE INVENTION

With a prior art game system, no consideration has been given to the aspect of performing continuous electronic play in which a plurality of players are controlling a common character (an object of operation) while taking turns. Furthermore, if after a change over has been performed the previous player goes away from the game, then his desire to continue by again participating in the game which is being continued by another player undesirably declines. Due to this type of reason, no electronic play method of the previously described type has ever been implemented The present invention takes as its object to provide a novel electronic playing system which solves this type of problem.

In order to achieve this object, the first invention is a game system which can be accessed by a plurality of players via operation terminals, comprising a memory and a calculation processing device, wherein a game program is stored in the memory, and the calculation processing device executes the game program based on input data from the operation terminals, and wherein the game system is made to implement: means for deciding that a plurality of players have participated for game playing; means for establishing team composition for the plurality of players; means for assigning a common character to each team; means for determining a reference point at which operation of the character is changed over between players who belong to the same team, based on the game program; means for deciding whether or not the character has arrived at this reference point, from parameters of the character; and means for transferring a right of operating the character to another player when the decision is affirmative, and performing control so as to continue operation of the character, based on a signal from the operation terminal by the other player.

According to this first invention, since, by the character arriving at the reference point, the right of operating the character is transferred to the side of the next player within the team, accordingly it becomes possible to provide a game system, with which it is possible to continue operating the same character continuously, even though the players change over.

In one embodiment of the game system of the first invention, there is a race game in which players compete for better ranking points for characters which correspond to vehicles. A plurality of game devices are mutually connected together via the internet. A server for controlling the synchronization of a plurality of game devices which are connected to a communication circuit may be connected to a separate communication circuit from the game machine, or one of the game devices may also have the function of acting as a server.

As for the method for team composition, the players who have established access may be divided up randomly, or may be divided up in order of access. As the reference point at which the players who belong to the same team change over, there are several examples. In one, it is a ground point which is present within a three dimensional virtual space which is defined by the game program. In a second, it is a time point on a time axis. The operation input from the second player is not used by the calculation processing device before the character arrives at this reference point; rather, the calculation processing device processes the character by operation input from the first player. After arrival at the reference point, the calculation processing device makes the input of the second player effective.

Means for transmitting information between the side of the first player and the side of the second player is provided. For example, voice chat (conversation) may be implemented between the first operation terminal and the second operation terminal. Or, alternatively, the same information as the image or the voice which is displayed on the player terminal, which has the right of operating the character, may be reproduced on the operation terminals of the other players within the team.

The first invention is one which is characterized by being a game device which is applied to the game system, by being a program for causing the already described calculation processing device to execute the already described means, and by being a storage medium on which this program is stored.

Furthermore, the present invention is an information processing method in a game system which can be accessed by a plurality of players via operation terminals, with this game system comprising a memory and a calculation processing device, and with a game program being stored in this memory, with the calculation processing device executing the game program based on input data from the operation terminals, characterized in that this information processing method in the game system is made so as to implement: a process of deciding that a plurality of players have participated in game playing; a process of establishing team composition for the plurality of players; a process of assigning a common character to each team; a process of determining a reference point at which change over operation of the character between players who belong to the same team is performed, based on the game program; a process of deciding whether or not the character has arrived at this reference point, from parameters of the character; and a process of transferring the right of operating the character to another player when this decision is affirmative, and performing control so as to continue operation of the character, based on a signal from the operation terminal by the other player.

A second invention is a game program for causing a computer device to input operation signals via operation means which are operated by a plurality of players, so as to execute a relay race game within a game space by player characters which are operated based on the operation signals, characterized by including: a game setting process of, based on operation signals from the players, reading out from a recording medium data for player characters based on selection by the players, and acquiring information about division of the players into teams for the relay race game, and about the order of play within each team; a game execution process of executing a start of the relay race game between the teams based on the team division information and the order-of-play information, and, based on the order-of-play information, performing a process of taking a player character of each team set as a current runner among the player characters, as a current runner character, to be moved within the game space; a display process of displaying the situation of movement as a game screen on game screen display means of the players; a decision process of acquiring position coordinates of the current runner character within the game space, taking a predetermined operation change over position as a reference point, and deciding whether or not the character is positioned within a predetermined distance range from the reference point; a notification process of, when decided that the current runner character is positioned within the predetermined distance range from the operation change over position, providing a display which announces a change over of operation of the current runner character on the game screen of the player who operates the next runner character which is set as the next runner among the player characters based on the-order-of play information; and an operation change over process of, when the current runner character arrives at the operation change over position, along with displaying the next runner character at the position of the current runner character, also inhibiting operation signals from the operator of the current runner character, and making effective an operation signal from the operator of the next runner character.

Thus, according to the second invention, in a game setting process of the game program, based on operation signals from the players, data for player characters is read out from a recording medium based on selection by the players, and information is acquired about division of the players into teams for the relay race game, and about the order of play within each team; and, in a game execution process, a start of the relay race game between the teams is executed based on the team division information and the order of play information.

At this time, in a display process, based on the order of play information, a process is performed of moving the player character of each team which is set as the current runner among the player characters within the game space as the current runner character, and displaying this situation as game screens on game screen display means of the players; and, from this display state, position coordinates of the current runner character within the game space are acquired, taking a predetermined operation change over position as a reference point, and a decision is taken (in a decision process) as to whether or not the character is positioned within a predetermined distance range from the reference point.

In the above described decision process, if it has been decided that the current runner character is positioned within the predetermined distance range from the operation change over position, a display is provided (in a notification process) which notifies a change over of operation of the current runner character on the game screen of the player to operate the next runner character which is set as the next runner among the player characters based on the order of play information.

And, in an operation change over process, when the current runner character arrives at the operation change over position, along with displaying the next runner character at the position of the current runner character, also operation signals from the operator of the current runner character are inhibited, and actuation signals from the operator of the next runner character are made effective.

Since the change over timing for a character whose operation is shared between a plurality of players is decided on in this manner, and a notification of the change over of operation is provided on the game screens of the players, accordingly the operation start time for operating the next runner character is clear, so that mistaken operation does not occur. On the other hand, by inhibiting the operation signals from the operator of the present runner character, the so caller relay zone becomes clear, and it is possible to prevent dishonest changing over.

With this second invention, it may be further characterized by including: a change over timing calculation process of, in the notification process, calculating timing at which operation change over is performed, based on the distance between the current runner character and the reference point; and a change over timing display process of providing a display which shows the timing of operation change over on the game screen of the operator of the next runner character, based on the change over timing information calculated by the change over timing calculation process.

It is possible to calculate the timing for performing the operation change over in advance according to the distance from the reference point, and, by displaying this change over timing, it is possible to make clear the ranges over which the player who is operating the present runner character and the player who will operate the next runner character can respectively perform operation.

Furthermore, with this second invention, it may be further characterized by including: a process of, in the notification process, displaying the next runner character translucently overlapped on the current runner character which is being displayed on the game screen of the operator of the next runner character; and a process of, based on the change over timing information which has been calculated by the change over timing calculation process, changing the transparency of the display of the current runner character and of the next runner character as the time for change over approaches, and, at the time point when the time for change over has arrived, displaying the next runner character normally along with deleting the display of the current runner character.

When changing over between the present runner character and the next runner character, it may happen that one of them disappears suddenly, and, when the other appears, the timing of the change over is missed. Thus, the next runner character is displayed translucently overlapped on the current runner character which is being displayed on the game screen of the operator of the next runner character, and furthermore, based on the change over timing information which has been calculated by the change over timing calculation process, the transparency of the display of the current runner character and of the next runner character are changed as the change over time approaches, so that, at the time point that the change over time is reached, along with the display of the current runner character being deleted, the next runner character is displayed in a normal manner, so that it is possible to make the change over timing clear.

Furthermore, with this second invention, it may be further characterized by including: a process of, in the announcement process, deforming the current runner character which is being displayed on the game screen of the operator of the next runner character into the next runner character; and a process of, based on the change over timing information which has been calculated by the change over timing calculation process, performing display so as to deform the current runner character into the next runner character as the time for change over approaches.

When changing over between the present runner character and the next runner character, it may happen that one of them disappears suddenly, and, when the other appears, the timing of the change over is missed. Thus, the current runner character which is being displayed on the game screen of the operator of the next runner character is deformed into the next runner character, and furthermore by performing display, based on the change over timing information which has been calculated by the change over timing calculation process, so that the current runner character is deformed into the next runner character as the change over time approaches, it is accordingly possible to make the change over timing clear.

According to the present invention, it is possible to provide a game system in which a plurality of players perform continuous electronic play by controlling a common character (an operated object) while taking turns. Furthermore it is possible to provide a game system with which, even after a change over has been performed, the desire of the previous player to continue taking part in the game increases.

DETAILED DESCRIPTION OF THE INVENTION

The First Embodiment

Figure 1:
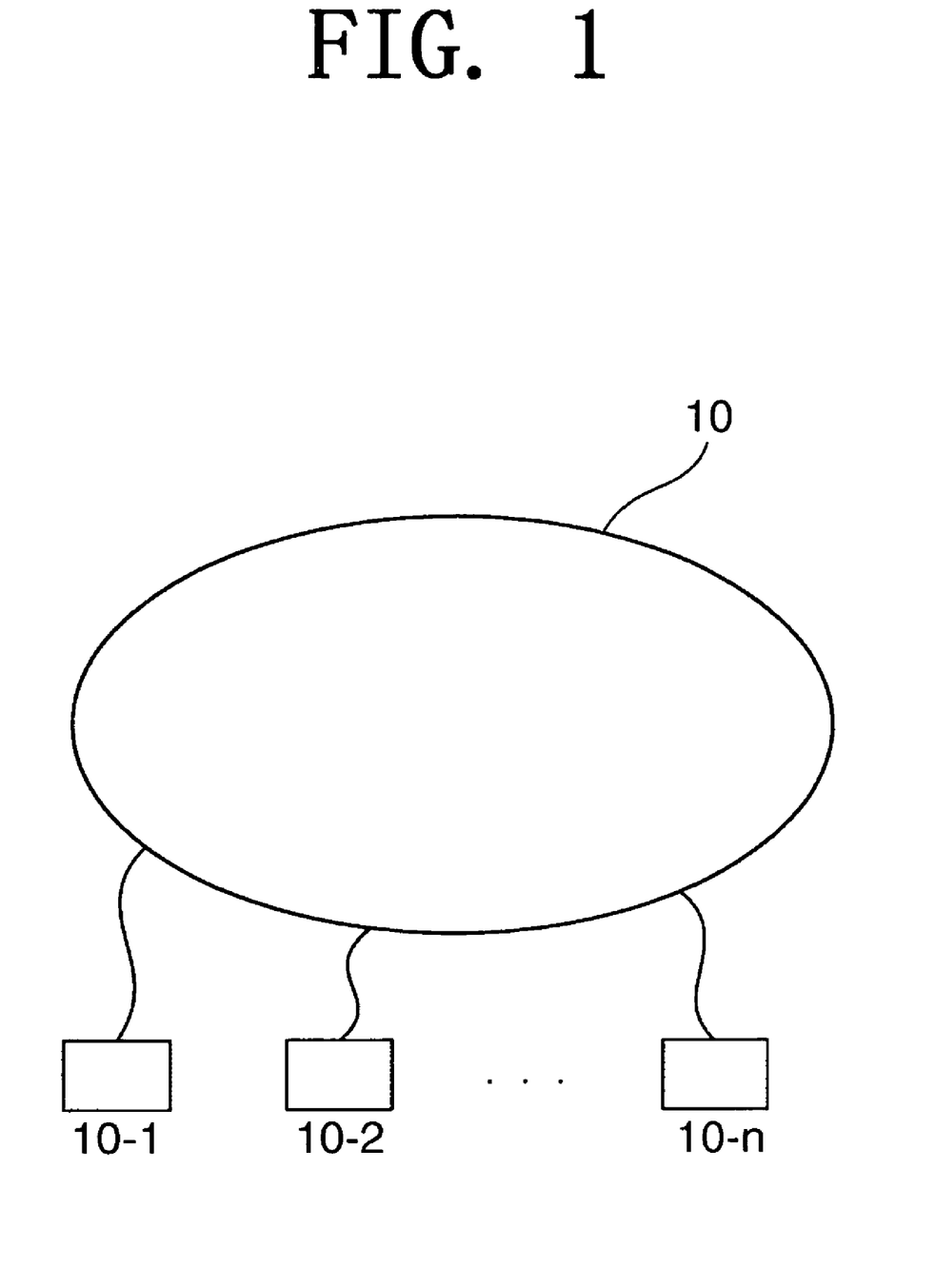
FIG. 1 is a network diagram of a game system according to the first embodiment.

FIG. 1 shows a situation in which a plurality of game device 10-1 through 10-n (hereinafter referred to as game devices 10, as a generic term) are connected to a communication circuit 10 which consists of the internet. The game device 10-1 also functions as a master game machine (a server), and controls the other clients (10-2 through 10-n) synchronously. And FIG. 2 shows the system structure of each of the game devices 10.

Figure 2:
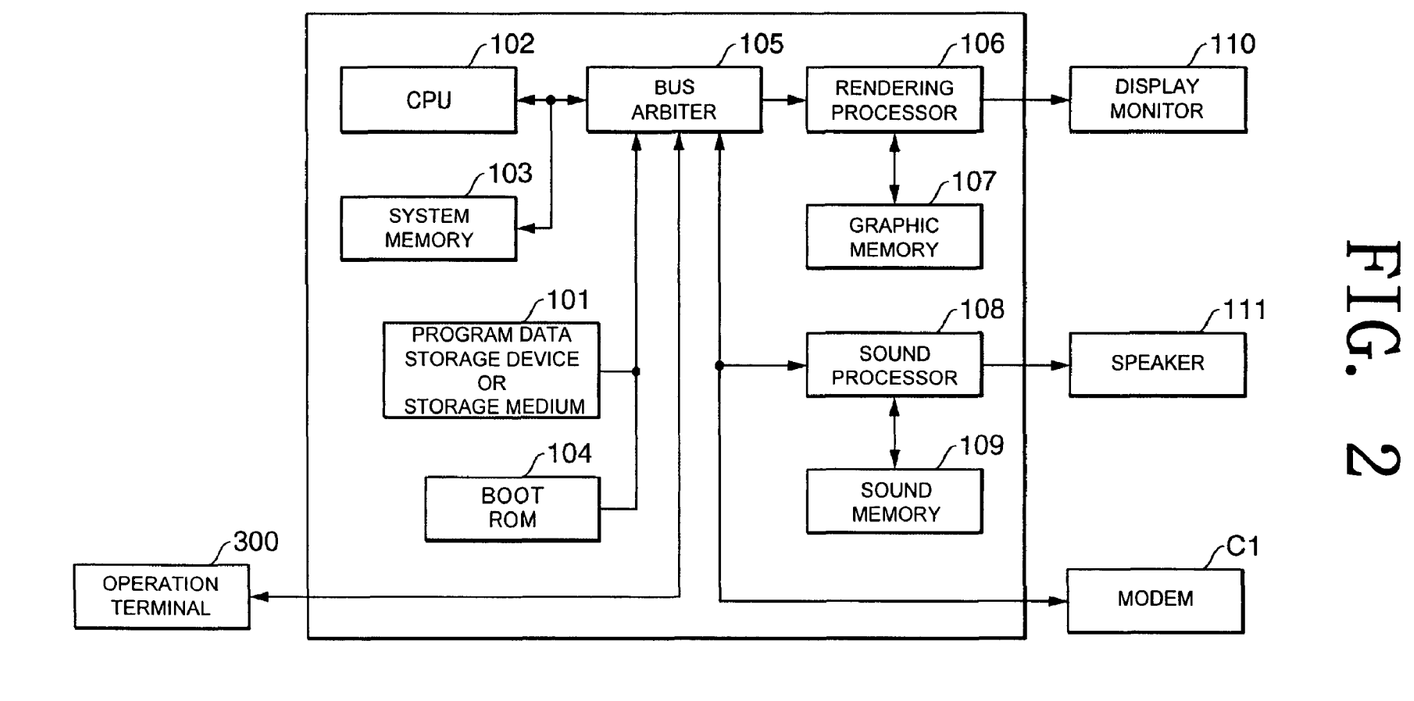
FIG. 2 is a block diagram of a game device according to the first embodiment.

As shown in FIG. 2, the game device 10 comprises: a program and data storage device or storage medium (also including an optical disk and an optical disk drive or the like) 101 on which a game program and data (including both image and voice data) are stored; a CPU 102 which executes the game program, and performs control of the overall system and coordinate calculation for displaying images and the like; a system memory 103 in which programs and data which are necessary for the CPU 102 to perform its procedures are stored; a BOOT ROM 104 on which programs and data which are necessary when starting the game device 10 are stored; and a bus arbiter 105 which controls the flow of programs and data between the various blocks of the game device 10, or to devices which are connected externally; and these are connected together by a bus.

A rendering processor 106 is connected to the bus, and reflection (movie) data which has been read out from the program and data storage device or storage medium 101, and images which may be created according to operation by the player and the progression of the game, are displayed by this rendering processor 106 on a display monitor 110. Graphic data and the like required for the rendering processor 106 to perform image generation are stored in a graphic memory 107.

A sound processor 106 is connected to the bus, and music data which has been read out from the program and data storage device or storage medium 101, and sound effects or voices which may be created according to operation by the player and the progression of the game, are outputted from a speaker 111 by this sound processor 108. Sound data and the like required for the sound processor 108 to perform sound effect and voice generation are stored in a sound memory 109. A modem/router C1 is connected to the game device 10, and performs communication with other game devices and a network server via an internet circuit. The reference symbol 300 is an operation terminal, and a dedicated controller, a keyboard, and a voice input device for voice chat are included in this operation terminal.

Figure 3:
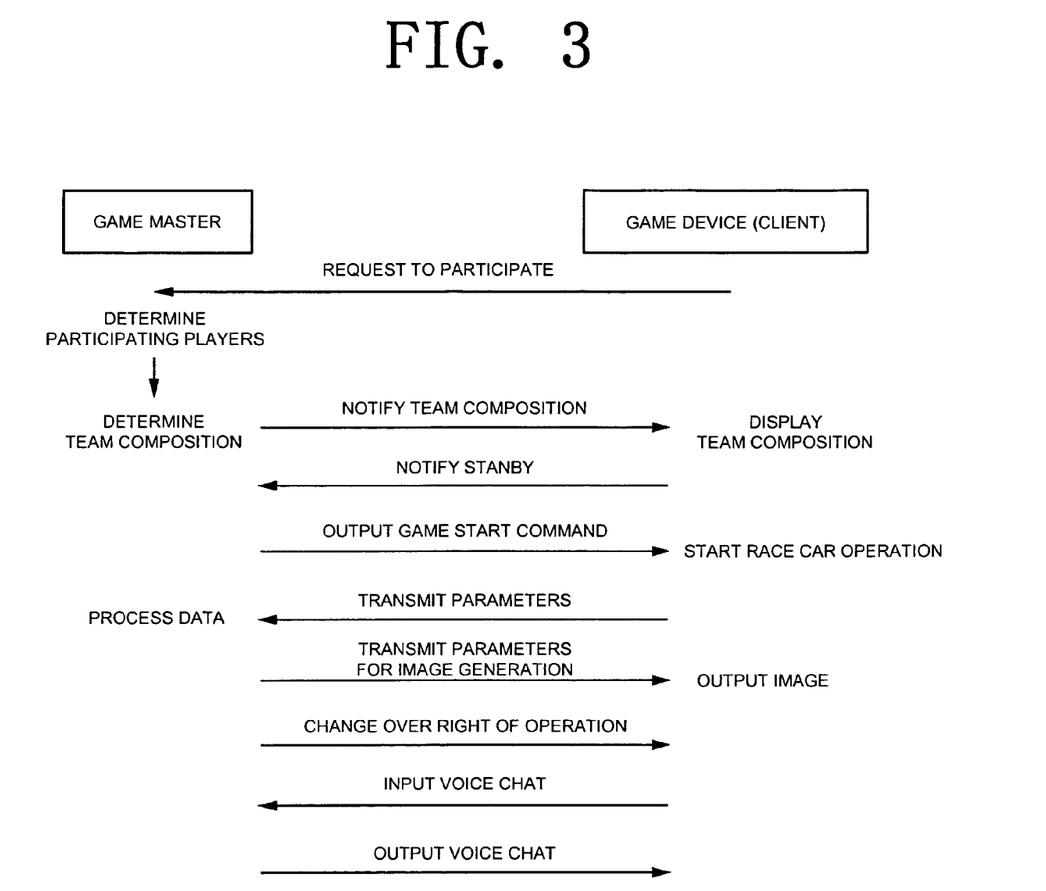
FIG. 3 is a operation chart of the game device according to the first embodiment.

In the game system shown in FIG. 1, team composition processing, race game execution processing, player change over processing, and various functions for information exchange between players who have been changed over are implemented. FIG. 3 is a chart showing the information exchange operation between the master device and a game device (clients): the master device receives entries from the various game devices, terminates the reception of entries and determines the players who will participate in game play at the time point at which the number of people reaches the number necessary for team composition, and then executes team composition processing for the players.

The CPU of the master device determines on the ID of the game device for which an entry has taken place and on the date and time of the entry, and stores it in a predetermined storage region of the system memory. For example, if it is supposed that four game devices have been entered, the game device (1P) which accessed the master first and the game device (2P) which accessed the master second may be made into team A, while 3P and 4P may be made into team B.

The CPU, along with setting flags for 1P and 2P in the memory region which show that they are on the same team, also sets a flag for 1P which shows that it is the first driver and a flag for 2P which shows that it is the second driver. The same is the case for 3P and 4P.

The master device 10-1 transmits the data related to team composition to each of the game devices. Each of the game devices displays on its monitor a screen related to team composition based on this data. This is performed by displaying the IDs of the game devices classified by team.

Next, standby signals are sent from each of the game devices to the master device to the effect that it is possible to start the game. The CPU of the game master outputs a game start command (a start display) to 1P and 3P which relate to the first runners. The CPUs of 1P and 3P receive operating input from their operation terminals, set parameters for creating images of race cars (characters) in the running state, and transmit them to the game master. The master device first sets parameters for creating images on the game devices from the parameters of all the running vehicles, and transmits them to the game devices.

The rendering processors of the game devices create and display images based on these parameters and the game program. This image creation is performed based on a point of view which has been defined in three dimensional coordinate space.

Figure 4:
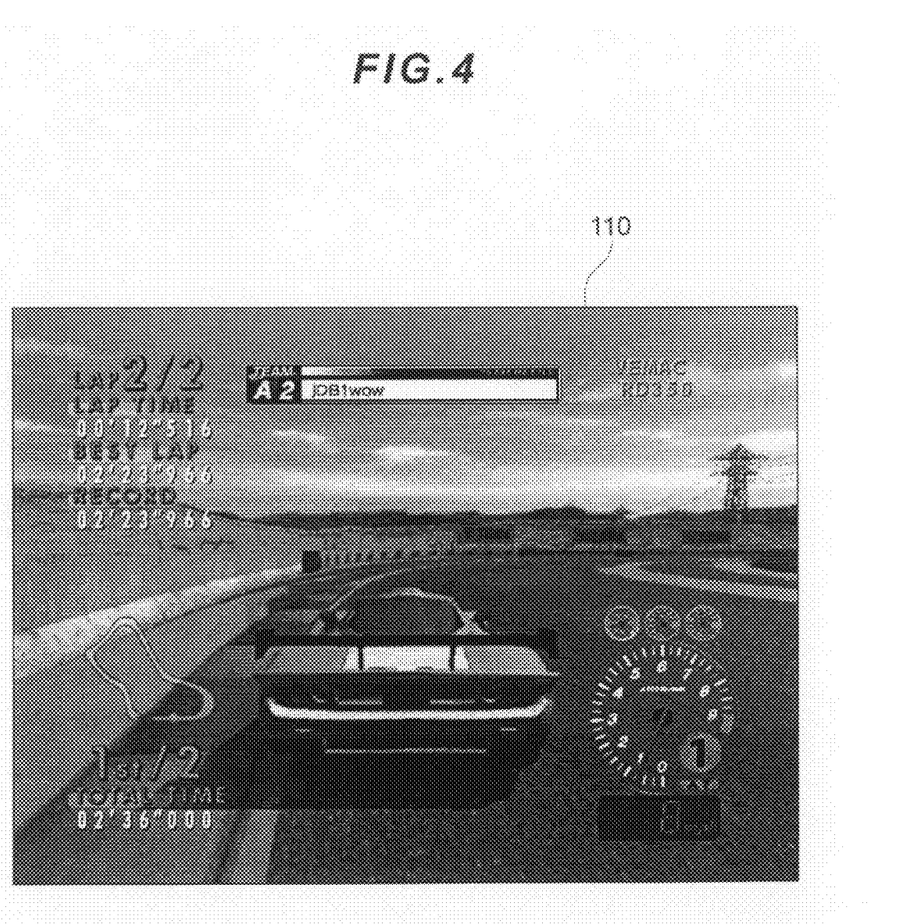
FIG. 4 is a figure showing a game screen outputted by the first embodiment.

FIG. 4 is a game screen which is displayed on the display monitor of 1P or 3P. The automobile at the center of the screen is a common character which is actuated by 1P and 2P (or 3P and 4P). The parameters related to the rate and the position of the character which have been created by the CPU of 1P (3P) are send via the game master to the side of the second driver 2P (4P). The CPU of 2P (4P) creates a game reflection based on these parameters. Accordingly, during the data processing period of 1P, the same image as that of 1P is displayed on the display monitor of 2P, which is in the waiting state. The same is true between 3P and 4P.

In regions 1P through 4P which are in the memory of the game master, there are provided flags related to the right of operation. During the processing period of 1P (before changing over), data is set in the operation flag which identifies that operation by 1P is effective. At this time, data is set in the flag related to 2P which shows that operation by 2P is inhibited. When a changeover of the right of operation from 1P to 2P is determined on by the CPU, these flags are reset, and the operation data of 2P is made effective. The same is true for 3P and 4P.

To continue the explanation further based on FIG. 3, the change over of the right of operation from 1P to 2P, or from 3P to 4P, is supposed to be performed when the character has made a specified number or more of circuits around a course in the three dimensional virtual space which is defined by the game program. In other words, when a certain ground point over the course has passed through the predetermined number of circuits, a change over of the right of operation for the character is performed.

When this change over is performed, the respective game devices for before and after the change over is notified by i.e. a display such as "Ready". After this change over has been performed, displays to the effect that the change over has been completed are made on the respective game devices for before and after the change over. The resetting of the flags related to the right of operation is performed at the time point that the character has passed the reference point. Since the two game devices which are being changed over are being actuated by their respective players before and after the character passes the reference point, it is not normal for blanks to occur on the input from their operation terminals.

The CPU of the game master permits voice chat between those game devices, for which a common flag is set which shows that they are on the same team. This voice chat is a function by which simultaneous conversation is possible between the game terminals which belong to the same team, via voice input and output devices. For example if, during operation of the character by 2P, voice input from 1P has been performed to the game master, then the CPU checks the flags in its memory, and outputs the voice signal to 2P, for which the same team flag is set. Accordingly, participation in the race game is possible even for a player, belonging to the same team, for whom the right of operating the character has been transferred. This may be easily understood if, for example, one considers that 1P is a navigator who is sitting beside 2P, who is the driver.

Apart from voice communication, character information is also available for information exchange between the players. A player who does not have the right of operation may input characters or symbols using his own game device. This game device may transmit the inputted information, via the game master, to the game device on the side of the player to whom the right of operation has been transferred. The characters or symbols are displayed on the monitor of the game device which has inputted this signal. For example, it becomes possible to transmit the direction of the next corner, whether it is a right curve or a left curve, or the degree of curvature of the curve to the player who is actuating the character by characters or symbols (arrow signs). For example, one example of cooperative play within a team is when, in a "navigator game" mode, one side becomes the driver and one side becomes the navigator, and a screen is displayed on the screen on the side of the driver which cannot be properly seen because fog has come down, while on the side of the navigator, instead of him being able to perform driving operation, the course is seen normally, so that he can issue commands for curving or braking or the like. It is also possible to provide a game scene such as one in which, each time the race character performs one circuit, the player on the side of the driver and the player on the side of the navigator change over.

The CPU of the game master decides whether or not a character has reached the goal, and calculates the points obtained by the team owing a character who has done so. The number of points obtained is added up and rankings are determined for all of the teams, and this total screen is transmitted to each of the game devices, and then the sequence of procedures terminates.

The Second Embodiment

In the following, a second embodiment of the present invention (a second invention) will be explained. It should be understood that, in this second embodiment, to structural portions which are the same as in the first embodiment, the same reference symbols are appended, and the explanation of their structure will be curtailed.

It should be understood that, in this second embodiment, there is shown a competitive game in which runner characters are applied as the objects which are operated, and these runner characters are ones which correspond to the vehicles in the vehicle running game of the first embodiment.

Mainly, the particular characteristic of this second embodiment is that a clear notification is issued when changing over operation between the players on the same team.

In other words, in the first embodiment, when changing over the operation, "Ready" was announced to the game devices for before and after the change over, and, before and after the reference point, which is a ground point for changing over, the two game devices which are changing over can each be actuated by its respective player.

According to this, the players recognize when changing over is occurring, and a smooth change over is possible, but sometimes it may happen that, due to change of the speed of the character which is being displayed or the like, the time of the change over does not become clear.

Thus, in this second embodiment, it is determined whether or not the present runner character is within a predetermined range from the reference point, and it is arranged to provide clear information about the time of change over to the players by notifying, based on the result of this decision, when he arrives at the reference point.

Figure 5:
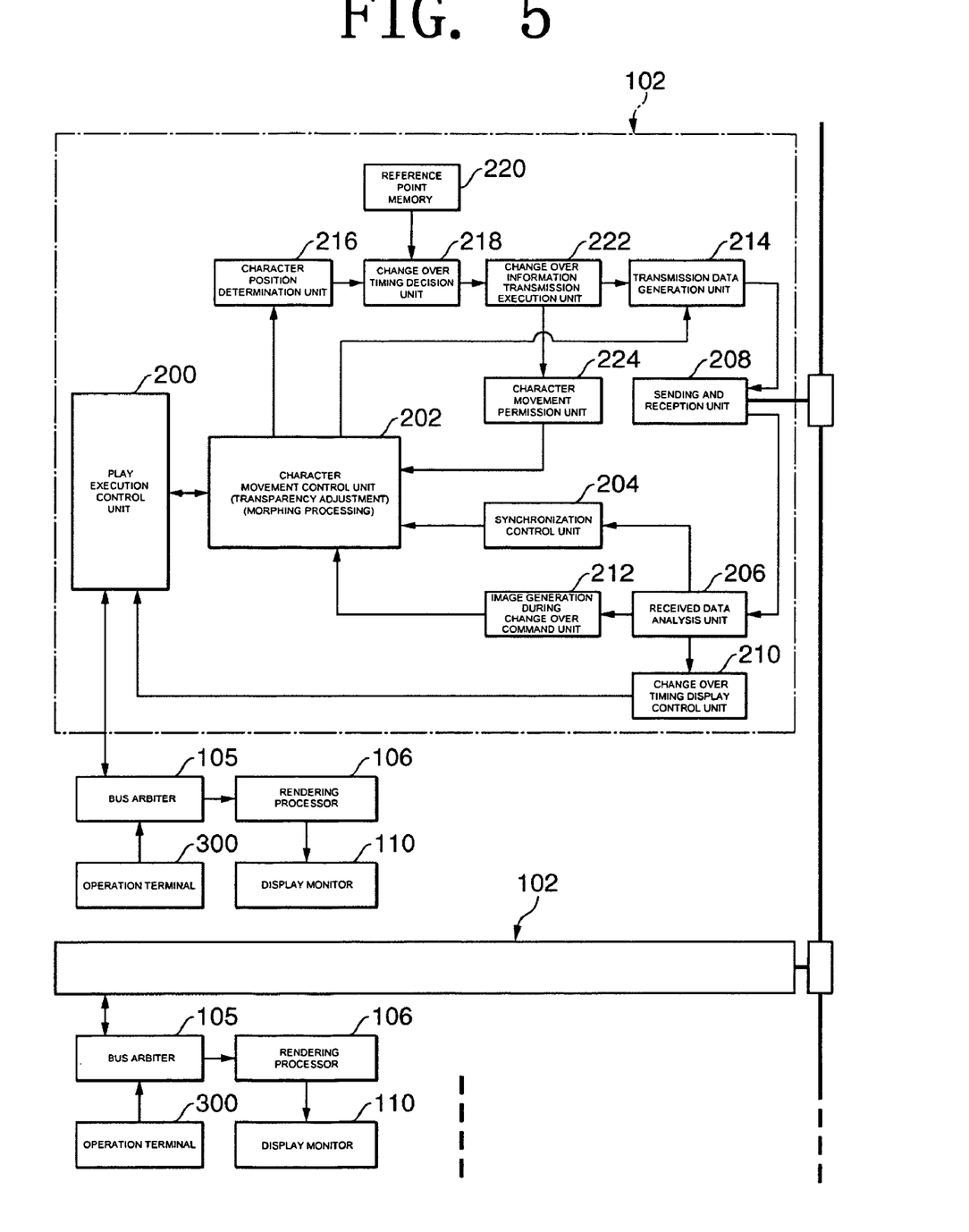
FIG. 5 is a functional block diagram for movement control of a runner character by a CPU which is fitted to a game device according to the second embodiment.

FIG. 5 is a block diagram, functionally showing the main points of the control by the CPU 102 of the game device 10, which mainly includes this change over time notification.

A play execution control unit 200 is a device which manages overall image processing based on this game program, and an operation terminal 300 is connected to it via a bus arbiter 105. Based on operation of this operation terminal 300, play is caused to progress by the play execution control unit 200. Furthermore, the progression of play by the play execution control unit 200 is displayed on a display monitor 110 which is connected via the bus arbiter 105 and a rendering processor 106.

A character movement control unit 202 is connected to this play execution control unit 200. By this character movement control unit 202, the movement is controlled of both its own runner character which is being operated by this operation terminal 300, and of the other runner characters which must be displayed on the display monitor 110 along with this own runner character.

A synchronization control unit 204 is connected to the character movement control unit 202. This synchronization control unit 204 fulfils the role of synchronizing the movement state of the other runner characters (their movement coordinates) to the display of its own game device, based on the information which has been received from the other game devices and has been analyzed by a received data analysis unit 206. This received data analysis unit 206 is connected to the bus via the sending and reception unit 208.

The positions of the other runner characters who are not on the same team, received from this synchronization control unit 204, are recognized by this character movement control unit 202 based on the position coordinates of these other runner characters.

In addition to this synchronization control unit 204, a change over timing display control unit 210 and an image generation during change over command unit 212 are connected to this received data analysis unit 206.

The change over timing display control unit 210 creates image data for display (notification) of the change over timing on the display monitor 110, based on the change over information which is transmitted from the other game devices which are on the same team. In other words, the change over timing display control unit 210 is connected to the play execution control unit 200, and, if a runner character which is actuated by another game device 10 on the same team is the present runner character, and the runner character which is actuated by this game device is the next runner character, then notification information is extracted by the received data analysis unit 206, and, based on this notification information, it commands the play execution control unit 200 to perform announcement control.

Figure 7:
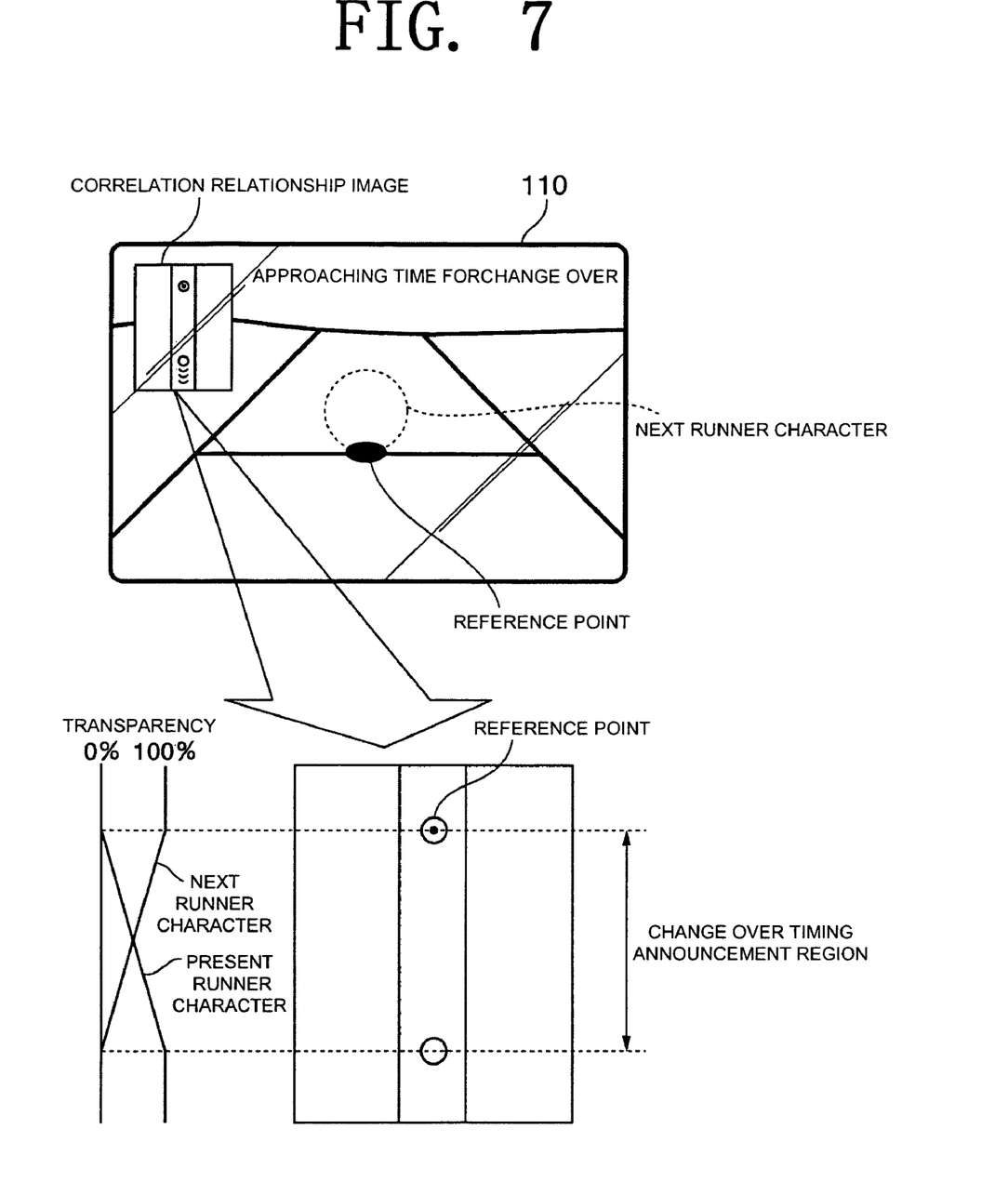
FIG. 7 shows a correlation related image which, according to the second embodiment, is displayed when changing over, and is a front view of a display monitor.

As for example shown in FIG. 7, the positional relationship of the two runner characters during the change over is made clear by this image generation during change over command unit 212, and a command is issued to the character movement control unit 202 to generate a correlation relationship image. Accordingly, an image which shows the correlation relationship of both of them as an image is added and displayed by the character movement control unit 202 in a portion of the image, taking its own runner character as a center, along with an announcement of the timing of this change over.

By seeing this correlation relationship image, the player who operates the operation terminal 300 is able to recognize the change over timing by visual inspection.

Furthermore, this character movement control unit 202 has at least one of a function of changing, between runner characters on the same team, the transparency during display of this operated character (a transparency adjustment function), and a morphing function of, between runner characters on the same team, deforming one into the other (a morphing processing function).

Both this transparency adjustment function and this morphing processing function are well known techniques, and they work by exerting control so that, at the change over timing, the present runner character gradually becomes higher in transparency, while the next runner character gradually drops in transparency, so that it is possible to make the timing of change over actuation clear, by making it appear that the present runner character is deformed gradually into the next runner character as the present runner character approaches the reference point at the change over timing.

On the other hand, if this game device 10 is the present runner character, then it has a function of sending position information for that present runner character to the other game devices 10 (despite whether they are on the same team or on different teams), and with a function of sending change over information to the other game device 10 of the same team which corresponds to the next runner character.

In other words, the character movement control unit 202 is connected to a transmission data generation unit 214, and transmits the position coordinates of its own runner character which is being operated by this game device 10 via the sending and reception unit 214 to the other game devices 10.

Furthermore, the character movement control unit 202 is connected to a character position determination unit 216. The position of the present character is determined by this character position determination unit 216, and these position coordinates are sent to a change over timing decision unit 218. A reference point memory 220 is connected to this change over timing decision unit 218. The coordinates of a reference point, which is the position for change over to the next runner character, are stored in this reference point memory 220, and it is decided from the reference point coordinates which have been read out from the reference point memory 220, whether or not the character is within the predetermined range.

This change over timing decision unit 218 is connected to a change over timing transmission execution unit 222, and, in the event that the character is within the predetermined range, transmission data is generated by the transmission data generation unit 214, and change over information is transmitted via the sending and reception unit 214 to the other game devices 10 of the same team. The transmission of this change over information continues until the character arrives at the reference point.

Furthermore, the change over information transmission execution unit 222 is connected to a character movement permission unit 224. Movement due to the operation of the operation terminal 300 of its own runner character before it has passed the reference point as a boundary is permitted to the character movement control unit 202 by the character movement permission unit 224, while, at the time point that the reference point is passed, movement of that runner character due to operation of the actuation terminal 300 becomes not permitted.

The operation of this second embodiment will be explained in the following.

The entry of this competitive game, the organization of teams, and the start of the game are the same as in the first embodiment, and are performed according to the communication protocol shown in FIG. 3.

Figure 6:
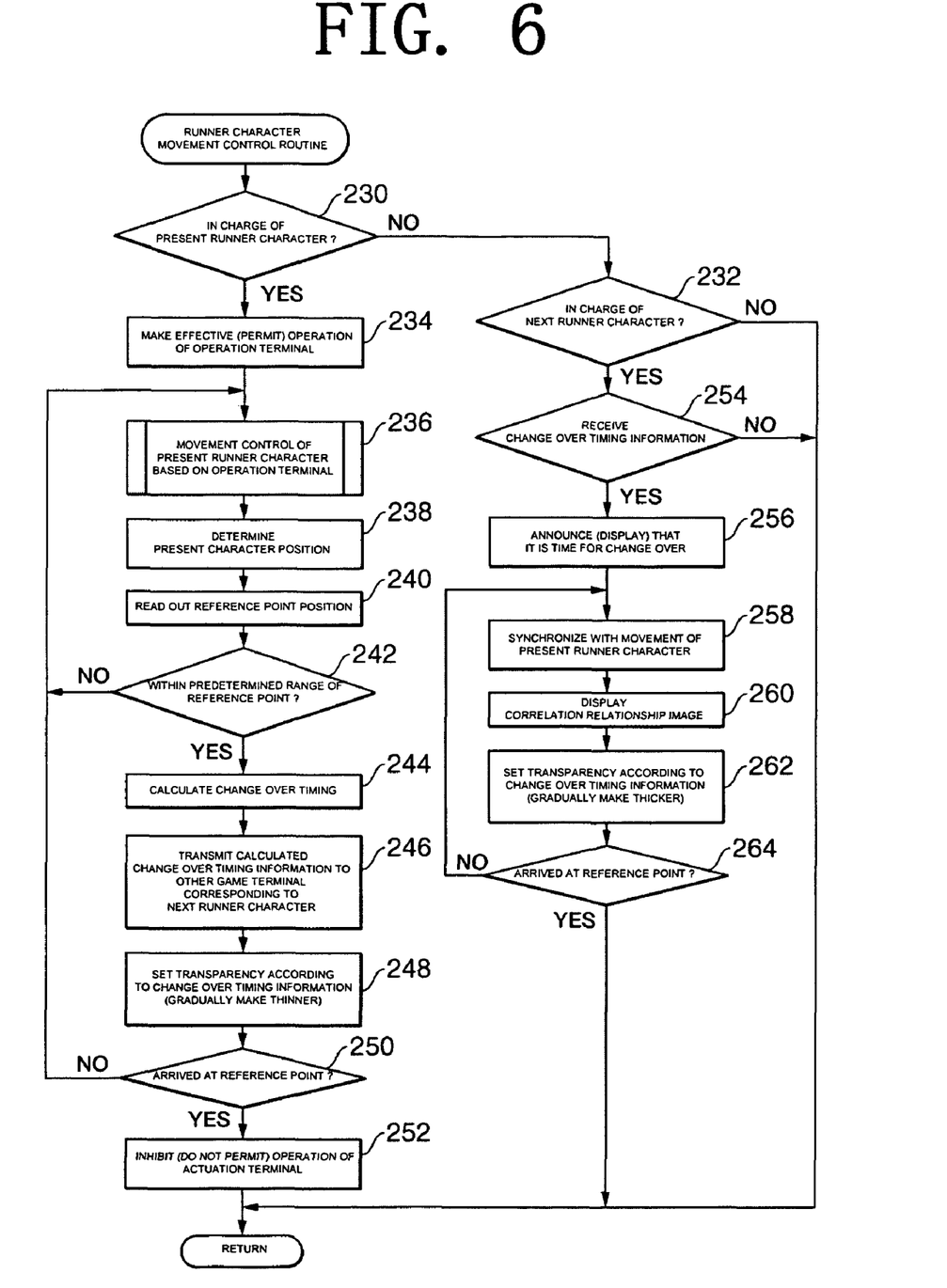
FIG. 6 is a flow chart showing a character movement control routine according to the second embodiment.

FIG. 6 shows the operation control routine of a runner character by the game device 10; and, in a step 230, that game device 10 takes a decision as to whether or not it is in charge of the present runner or not, and when the decision is negative, the flow of control shifts to a step 232, and a decision is taken as to whether or not it is in charge of the next runner.

If in the step 230 the decision is affirmative, a procedure is performed for operating the movement of the present runner character by operation of the operation terminal 300. On the other hand, if in the step 232 the decision is affirmative, then a procedure is performed for operating the movement of the next runner character by operation of the operation terminal 300. Furthermore, if a negative decision has been taken in the step 232, then it is decided that this is a waiting terminal (a terminal which corresponds to neither the present runner character nor the next runner character), and this routine terminates.

If in the step 230 an affirmative decision is taken, the flow of control proceeds to a step 234, and operation of the present runner character by the operation terminal 300 is made effective (i.e. is permitted), and the flow of control proceeds to the next step 236, in which movement control for the present runner character is performed based on operation of the operation terminal 300, and then in a next step 238 the position (i.e. the coordinates) of that present runner character are determined.

In the next step 240, the position (i.e. the coordinates) of the reference point are read out, and in a step 242, based on the position of the present character and the reference point, it is decided whether or not it is within the predetermined range with respect to the reference point (either in terms of distance, or in terms of time, is acceptable).

If in this step 242 a negative decision is taken, it is decided that it is not the time for change over, and the flow of control returns to the step 236, so that the above described process is repeated.

Furthermore, if in the step 242 an affirmative decision is taken, it is decided that it is the time for change over, and the flow of control proceeds to a step 244, in which the change over timing to the next runner character is calculated based on the position of the present character, the distance to the reference point, the movement rate of the present character, and so on.

In the next step 246, the change over timing information which has been calculated is transmitted to the other game device 10 which corresponds to the next runner character, and then the flow of control proceeds to a step 248.

In this step 248, the transparency of the present runner character is set according to the result of calculation of the change over timing. In other words, as the present runner character whose transparency is 0% nears the reference point, its transparency is gradually increased, and, when it arrives at the reference point, its transparency is made to be 100% (refer to FIG. 7).

In the next step 250, a decision is taken as to whether or not the character has arrived at the reference point, and, if a negative decision has been taken, the flow of control returns to the step 236. Furthermore, if in the step 250 an affirmative decision is taken, the flow of control shifts to a step 252, and it is arranged for operation by the operation terminal 300 to be invalid (i.e. not to be permitted), and then this routine terminates.

Next, if in the step 232 an affirmative decision is taken, the flow of control shifts to a step 254, and it is decided whether or not the change over timing information has been received, and, in the case of a negative decision, this routine terminates. It should be understood that, at this time, the movement state of the present runner character is displayed on the display monitor 110.

When an affirmative decision is taken in the step 254, the flow of control proceeds to a step 256, and a notification is displayed to the effect that it is the time of changing over, and the flow of control then proceeds to the next step 258, in which, in synchrony with the movement of the present runner character, an image in which the next runner character (the character which is to be operated by itself) is taken as the subject is created and is displayed.

In the next step 260, the correlation relationship image is displayed as overlapped over a portion of the display monitor 110, and then the flow of control proceeds to a step 262.

In the step 262, the transparency of the next present runner character is set according to the change over timing information, and then the flow of control proceeds to the step 264. In other words, directly after receipt of the change over timing, the transparency of the next runner character is made to be almost 100%, and, as the present runner character approaches the reference point, gradually this transparency is reduced, so that the transparency becomes 0% (refer to FIG. 7) at the time of the change over (i.e. when the present runner character arrives at the reference point).

In the step 264, a decision is taken as to whether or not the character has arrived at the reference point, and, in the case of a negative decision, the flow of control returns to the step 258. Furthermore, if in the step 264 an affirmative decision has been taken, this routine terminates, but, when this routine starts its processing the next time, an affirmative decision comes to be taken in the step 230.

It should be understood that while, in this second embodiment, it was arranged, along with the present runner character approaching the reference point, to gradually increase its transparency (i.e. to make it gradually fainter), while gradually reducing the transparency of the next runner character (i.e. making it gradually more opaque), it would also be acceptable to deform the present runner character gradually into the next runner character, i.e. to perform so called morphing processing.

We claim:

1. A computer-readable medium storing instructions for configuring a processor to perform a method for performing a relay race game in which a plurality of players input operation signals via respective operation means, the relay race game being performed within a game space by player characters which are operated based on the operation signals, and in which game images of the relay race game corresponding to each player are created and outputted as a game screen to display means corresponding to each player, wherein said method comprises:

a game setting process of, based on operation signals from the players, reading out from a recording medium data for player characters based on selection by the players, and acquiring information about division of the players into teams for said relay race game, and about an order of play within each team;

a game execution process of executing a start of said relay race game between the teams based on said team division information and the order-of-play information, and, based on the order-of-play information, performing a process of taking a player character of each team set as a current runner among said player characters, as a current runner character, to be moved within the game space;

a display process of, based on the order-of-play information, moving the player character of each team which is set as the current runner among the player characters within said game space as the current runner character, and displaying the situation of movement as a game screen on game screen display means of the players;

a decision process of acquiring position coordinates of said current runner character within the game space, taking a predetermined operation change over position as a reference point, and deciding whether or not said current runner character is positioned within a predetermined distance range from the reference point;

a notification process of, when decided that said current runner character is positioned within the predetermined distance range from the operation change over position, providing a display which notifies a change over of operation of said current runner character on the game screen of the player who operates a next runner character which is set as a next runner among the player characters based on the order-of-play information;

an operation change over process of, when said current runner character arrives at the operation change over position, along with displaying said next runner character at the position of said current runner character, also inhibiting operation signals from the operator of said current runner character, and making effective an operation signal from the operator of the next runner character;

a change over timing calculation process of, in said notification process, calculating timing at which operation change over is performed, based on the distance between said current runner character and said reference point; and a change over timing display process of providing a display which shows timing of operation change over on the game screen of the operator of said next runner character, based on the change over timing information calculated by the change over timing calculation process.

2. The computer-readable medium according to claim 1, the method further comprising:

a process of, in said notification process, displaying said next runner character translucently overlapped on said current runner character which is being displayed on said game screen of the operator of said next runner character; and a process of, based on the change over timing information which has been calculated by said change over timing calculation process, changing the transparency of the display of said current runner character and of said next runner character as the time for change over approaches, and, at the time point when the time for change over has arrived, displaying said next runner character normally along with canceling the display of said current runner character.

3. The computer-readable medium according to claim 1, the method further comprising:

a process of, in said notification process, deforming said current runner character which is being displayed on the game screen of the operator of said next runner character into said next runner character; and a process of, based on the change over timing information which has been calculated by the change over timing calculation process, performing display so as to deform said current runner character into said next runner character as the time for change over approaches.

4. A computer device programmed according to a game program to execute a relay race game in which a plurality of players input operation signals via respective operation means, the relay race game being executed within a game space by player characters which are operated based on the operation signals, and in which game images of the relay race game corresponding to each player are created and outputted as a game screen to display means corresponding to each player, said game program causing the computer device to perform:

a game setting process of, based on operation signals from the players, reading out from a recording medium data for player characters based on selection by the players, and acquiring information about division of the players into teams for said relay race game, and about an order of play within each team;

a game execution process of executing a start of said relay race game between the teams based on said team division information and the order-of-play information, and, based on the order-of-play information, performing a process of taking a player character of each team set as a current runner among said player characters, as a current runner character, to be moved within the game space;

a display process of, based on the order-of-play information, moving the player character of each team which is set as the current runner among the player characters within said game space as the current runner character, and displaying the situation of movement as a game screen on game screen display means of the players;

a decision process of acquiring position coordinates of said current runner character within the game space, taking a predetermined operation change over position as a reference point, and deciding whether or not said current runner character is positioned within a predetermined distance range from the reference point;

a notification process of, when decided that said current runner character is positioned within the predetermined distance range from the operation change over position, providing a display which notifies a change over of operation of said current runner character on the game screen of the player who operates a next runner character which is set as a next runner among the player characters based on the order-of-play information;

an operation change over process of, when said current runner character arrives at the operation change over position, along with displaying said next runner character at the position of said current runner character, also inhibiting operation signals from the operator of said current runner character, and making effective an operation signal from the operator of the next runner character;

a change over timing calculation process of, in said notification process, calculating timing at which operation change over is performed, based on the distance between said current runner character and said reference point; and a change over timing display process of providing a display which shows timing of operation change over on the game screen of the operator of said next runner character, based on the change over timing information calculated by the change over timing calculation process.

5. The computer device according to claim 4, the game program causing the computer device to further perform:

a process of, in said notification process, displaying said next runner character translucently overlapped on said current runner character which is being displayed on said game screen of the operator of said next runner character; and a process of, based on the change over timing information which has been calculated by said change over timing calculation process, changing the transparency of the display of said current runner character and of said next runner character as the time for change over approaches, and, at the time point when the time for change over has arrived, displaying said next runner character normally along with canceling the display of said current runner character.

6. The computer device according to claim 4, the game program causing the computer device to further perform:

a process of, in said notification process, deforming said current runner character which is being displayed on the game screen of the operator of said next runner character into said next runner character; and a process of, based on the change over timing information which has been calculated by the change over timing calculation process, performing display so as to deform said current runner character into said next runner character as the time for change over approaches.

7. A method, implemented by a processor, for performing a relay race game in which a plurality of players input operation signals via respective operation means, the relay race game being executed within a game space by player characters which are operated based on the operation signals, and in which game images of the relay race game corresponding to each player are created and outputted as a game screen to display means corresponding to each player, wherein said method comprises:

a game setting process, by the processor, of, based on operation signals from the players, reading out from a recording medium data for player characters based on selection by the players, and acquiring information about division of the players into teams for said relay race game, and about an order of play within each team;

a game execution process of executing a start of said relay race game between the teams based on said team division information and the order-of-play information, and, based on the order-of-play information, performing a process of taking a player character of each team set as a current runner among said player characters, as a current runner character, to be moved within the game space;

a display process of, based on the order-of-play information, moving the player character of each team which is set as the current runner among the player characters within said game space as the current runner character, and displaying the situation of movement as a game screen on game screen display means of the players;

a decision process of acquiring position coordinates of said current runner character within the game space, taking a predetermined operation change over position as a reference point, and deciding whether or not said current runner character is positioned within a predetermined distance range from the reference point;

a notification process of, when decided that said current runner character is positioned within the predetermined distance range from the operation change over position, providing a display which notifies a change over of operation of said current runner character on the game screen of the player who operates a next runner character which is set as a next runner among the player characters based on the order-of-play information;

an operation change over process of, when said current runner character arrives at the operation change over position, along with displaying said next runner character at the position of said current runner character, also inhibiting operation signals from the operator of said current runner character, and making effective an operation signal from the operator of the next runner character;

a change over timing calculation process of, in said notification process, calculating timing at which operation change over is performed, based on the distance between said current runner character and said reference point; and a change over timing display process of providing a display which shows timing of operation change over on the game screen of the operator of said next runner character, based on the change over timing information calculated by the change over timing calculation process.

8. The method according to claim 7, further comprising:

a process of, in said notification process, displaying said next runner character translucently overlapped on said current runner character which is being displayed on said game screen of the operator of said next runner character; and a process of, based on the change over timing information which has been calculated by said change over timing calculation process, changing the transparency of the display of said current runner character and of said next runner character as the time for change over approaches, and, at the time point when the time for change over has arrived, displaying said next runner character normally along with canceling the display of said current runner character.

9. The method according to claim 7, further comprising:

a process of, in said notification process, deforming said current runner character which is being displayed on the game screen of the operator of said next runner character into said next runner character; and a process of, based on the change over timing information which has been calculated by the change over timing calculation process, performing display so as to deform said current runner character into said next runner character as the time for change over approaches.

\* \* \* \* \*

UNITED STATES PATENT AND TRADEMARK OFFICE
CERTIFICATE OF CORRECTION

PATENT NO. : 7,749,056 B2  Page 1 of 1
APPLICATION NO. : 10/573598
DATED : July 6, 2010
INVENTOR(S) : Hiroshi Ando et al.

It is certified that error appears in the above-identified patent and that said Letters Patent is hereby corrected as shown below:

\* On the Title Page, Item (87), in the "PCT Pub. Date:" "Sep. 27, 2004" should read --Apr. 7, 2005--.

On the Title Page, Item (57), in the Abstract, line 5, "has willing" should read --is willing--.

On the Title Page, in the Abstract, line 19, "addording" should read --according--.

Signed and Sealed this

Second Day of November, 2010

David J. Kappos
*Director of the United States Patent and Trademark Office*